Nov. 16, 1965   L. A. WILLIAMS   3,218,248
ELECTROLYTIC CAVITY SINKING APPARATUS AND METHOD
Filed Oct. 12, 1961   2 Sheets-Sheet 1

INVENTOR:
Lynn A. Williams
BY
Wupper, Gradolph & Love
ATTYS

Nov. 16, 1965   L. A. WILLIAMS   3,218,248
ELECTROLYTIC CAVITY SINKING APPARATUS AND METHOD
Filed Oct. 12, 1961   2 Sheets-Sheet 2
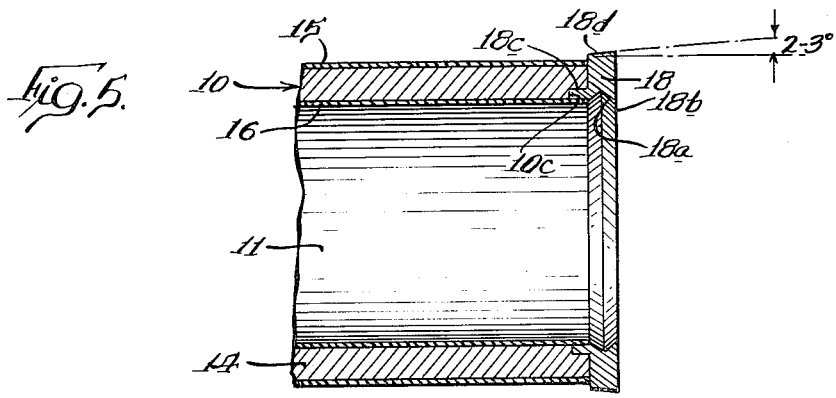
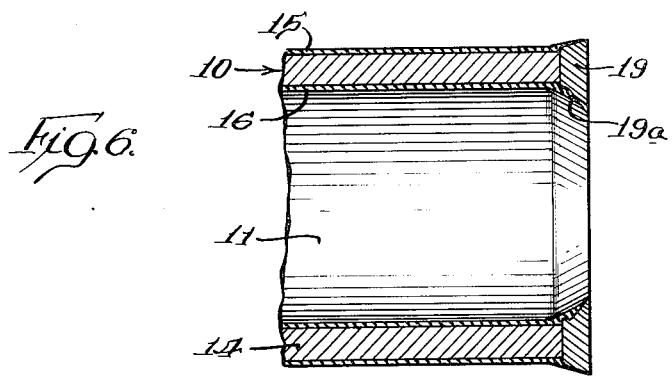
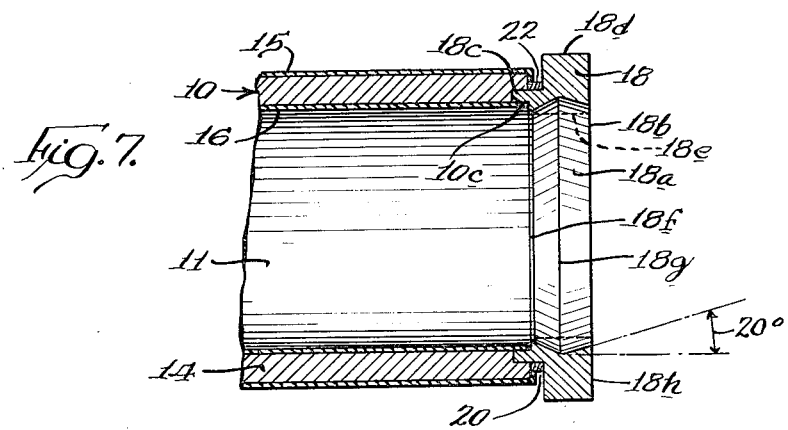
INVENTOR.
Lynn A. Williams
BY
Wupper, Gradolph & Love
Attys

United States Patent Office 3,218,248
Patented Nov. 16, 1965

3,218,248
ELECTROLYTIC CAVITY SINKING
APPARATUS AND METHOD
Lynn A. Williams, Winnetka, Ill., assignor to Anocut
Engineering Company, Chicago, Ill., a corporation
of Illinois
Filed Oct. 12, 1961, Ser. No. 144,697
7 Claims. (Cl. 204—284)

This invention relates to an improved apparatus and method for the making of cavities by electrolytic metal removal.

In the copending application of Lynn A. Williams, entitled, Electrolytic Shaping, Serial No. 772,960, filed November 10, 1958, and issued into Patent No. 3,058,895, dated October 16, 1962, there are disclosed apparatus and methods whereby metal might be removed at surprisingly rapid rates with good accuracy and high finish by the passage of a direct electric current through an electrolyte held under pressure and moving at high velocity between an electrode connected to the negative pole of the direct current source and a workpiece connected to the positive pole of the direct current source. This invention constitutes an improvement over the subject matter disclosed in the above identified copending application. It also constitutes an improvement over the subject matter disclosed in copending application of Joseph L. Bender and Lynn A. Williams, entitled, Electrolytic Cavity Sinking Apparatus and Method, Serial No. 37,766, filed June 21, 1960.

When it is desired to make relatively long and slender cavities by electrolytic removal, it has been found that when the electrolyte is pumped through a hollow electrode at a relatively high pressure, so that high pressure is maintained in a narrow work gap between the electrode and the workpiece, and in such a manner that the electrolyte is moving at rapid velocity in the work gap, difficulty is sometimes encountered because of a tendency of the long, slender, hollow electrode to vibrate laterally in such a way as to cause short-circuiting by making contact between the working tip of the electrode and the workpiece. When this occurs, a spark or arc passes, which may cause damage both to the electrode and to the work. Such lateral vibration may also cause deviations from the desired size of the cavity and produce inaccuracies in the work. Numerous experiments have shown that any situation in which vibration of an electrode occurs will, quite surely, be deleterious to the best operation of this process. It should be pointed out that the problem scarcely arises except in the situation where relatively high pressures and high velocities of the electrolyte are used and only in those situations in which the work gap is relatively small. It has been found that ordinarily vibration will not occur when the electrolyte pressure is held below 15 p.s.i. gauge or when the gap between the tip of the electrode and the work is maintained at approximately .015" or greater. This relatively large work gap may be maintained by the use of a high voltage and a relatively slow advance of the electrode into the cavity. However, the use of high voltages presents disadvantages in safety, in power consumption, in the generation of heat in the electrolyte, in achieving optimum finish, etc. A slow rate of infeed is obviously undesirable because it reduces the productivity of the equipment utilizing the process.

It is desirable to be able to use electrolyte pressures of three atmospheres or more, and, in many situations, it is preferable to use electrolyte pressures of at least 175 p.s.i. ranging upward to 250 p.s.i. The maintenance of a work gap in the range between .002" and .012" is also preferred.

One of the advantages of utilizing high pressure, in addition to those which have been previously pointed out in the prior copending application Serial No. 772,960, now U.S. Patent No. 3,058,895, lies in the fact that it becomes possible to utilize a very inexpensive electrolyte consisting of water with common salt mixed in the ratio of one pound of salt to one gallon of water. This simple and inexpensive solution of sodium chloride has a number of advantages in addition to the fact that its cost is low. One of these lies in the fact that with many materials, especially virtually all alloys of steel and many of the so-called super alloys having a nickel or cobalt base, the products of decomposition of the work are found as insoluble salts, commonly iron hydroxide in the case of steel and nickel or cobalt hydroxide or both in the case of super alloys. Because these salts are insoluble, the electrolyte does not accumulate soluble metallic salts of a kind which tend to form an electrodeposit or plate upon the electrode.

On the other hand, the formation of insoluble salts has the disadvantage that these insoluble products of decomposition as they are formed on the surface of the workpiece have some tendency to adhere to the work. Ordinarily, they are poor current conductors or are insulators, and their effect, therefore, is to insulate off the parent material of the workpiece in such a way that little or no current passes wherever the work surface holds a speck of insoluble salts. When this occurs, the affected area is not attacked electrolytically, and, as the electrode continues to move into the cavity, it will remove metal everywhere except in the area or areas where the passive coating has adhered. In a short time, whatever work gap previously existed, for example .005", is closed by the advance of the electrode, which comes into contact with the adhered products of decomposition, and, in some instances, this will actually cause mechanical damage to the electrode. At the same time, it will sometimes happen that the mechanical pressure of the electrode against the products of decomposition may cause the latter to break apart in such a way as to cause a sudden short circuit between the parent metal beneath the passive layer and the metal surface of the electrode, with the consequence that an arc is formed, causing damage both to the electrode and to the work.

It has been found that with common salt this may be avoided by maintaining an electrolyte pressure across the work gap of the order of 150 p.s.i. or more, and safer and more reliable protection is obtained in this respect by holding a minimum of 175 p.s.i. pressure. Under these conditions, the velocity of the electrolyte as well as the increased effective density of the electrolyte (through reduction in the size of gap bubbles in the electrolyte) is such as to minimize the formation of adherent products of decomposition. At the same time, the rather surprising result that is found is that a high polish is induced on the work surface of the work material. So far as is known, common salt water has not heretofore been regarded as a suitable electropolishing agent. Yet, on 18-8 stainless steel and on such super alloys as A–286, Udimet 700, Udimet 500, René 41 and others of these types a mirror finish may be obtained.

It has been found that the finish may be improved and better operating results obtained by adding to the salt water solution described above one-half pound per gallon of sodium nitrate or potassium nitrate. It should also be pointed out that potassium chloride may be used in place of sodium chloride, although the potassium chloride is somewhat more costly.

Accordingly, it is desirable to be able to use high pressures in the electrolyte system, and this in many instances requires some means to overcome the tendency of electrodes to vibrate.

One of the objects of this invention is to carry out electropolishing of nickel and cobalt alloy steels and of other steel materials in general by the use of a solution of inexpensive common salts, such as sodium chloride or potassium chloride, sometime admixed with sodium or potassium nitrate in the solution.

Another object of the invention is to provide an electrode constructed to eliminate the tendency of the electrode to vibrate when penetrating a workpiece in electrochemical removal and when operated at relatively high electrolyte pressures.

Another object is to provide a hollow or tubular electrode having immediately adjacent its outlet a chamber-like formation or pocket for static pressure electrolyte to prevent lateral vibration of the electrode when penetrating a workpiece and receiving electrolyte pumped thereto and through under very high pressures.

Other objects and advantages will become apparent from the following description taken in conjunction with the accompanying drawings wherein:

FIGS. 5, 6 and 7 are similar fragmentary sectional views of electrodes constructed according to this invention by means of which lateral electrode vibration may be eliminated.

The general system in which this invention finds its place is disclosed in considerable detail in copending application Serial No. 772,960, now U.S. Patent No. 3,058,895, and is shown further in a number of other copending applications as follows: Lynn A. Williams, Serial No. 814,450, filed May 20, 1959, and now U.S. Patent No. 3,002,907, entitled, Electrolytic Hole Sinking; Lynn A. Williams and James E. Davis, Serial No. 863,246, filed December 31, 1959, entitled, Control and Operating System for Electrolytic Hole Sinking; and Lynn A. Williams, Serial No. 73,154, filed September 2, 1960, entitled, Electrolytic Cavity Sinking Apparatus and Method.

It is intended to incorporate herein the teachings of these prior copending applications by this reference.

Figure 1:
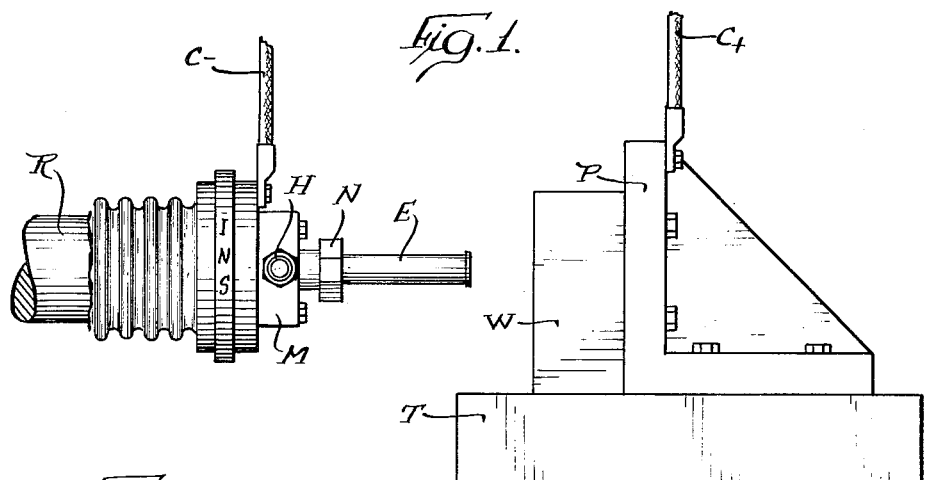
FIG. 1 shows schematically a hollow electrode arranged to be plunged into a workpiece.

Referring to FIG. 1, there is shown a movable ram R arranged to drive a hollow electrode E toward a workpiece W. A hose connection H is provided in a manifold M which communicates with the bore of the electrode E, and it is intended that this be fed with a hose from a high pressure pump with a suitable filtering system as shown, for example, in copending application Serial No. 73,154. Electrical connections are made by cable C— to the manifold block M to which the electrode E is mounted and by cable C+ to the mounting for the workpiece W, which is shown as an angle plate P resting upon and bolted to a worktable T.

It should be understood that all of this apparatus is mounted in a suitable enclosure, and that there is a pan beneath it for collection of the electrolyte after use so that it may be returned to a suitable reservoir. Inasmuch as the details of these arrangements are shown in previously identified copending applications, particularly application Serial No. 73,154, and inasmuch as commercial apparatus embodying these is now available on the market and is, thus, well known, there is no need to enlarge this description in this specification.

Figure 2:
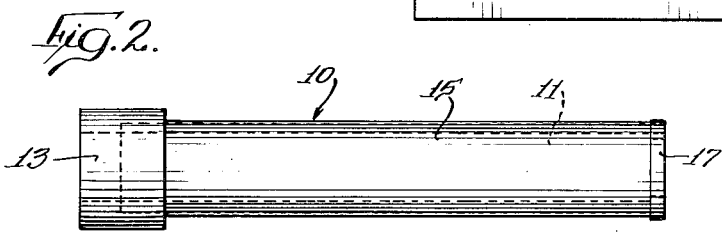
FIG. 2 shows a typical cylindrical electrode used for this purpose.

Referring to FIG. 2, there is shown a cylindrical electrode, but it should be understood that the electrode may be of any other transverse shape without deviating from the spirit of the invention. Thus, the transverse shape may be that of a square or a triangle or a hexagon, or it may be that of an airfoil or some other irregular shape. Commonly, the electrode itself, identified by the reference numeral 10, may be mounted in some form of header block 13, which is adapted to be mounted in the manifold M by a clamp nut N, as shown in FIG. 1. The electrode itself is hollow, having a bore 11 therethrough, and ordinarily will have a rather thin wall 14. This is particularly true where it is desired to trepan a hole, leaving a slug S which will extend upwardly within the electrode. By keeping the electrode wall thin, the actual amount of material which needs to be removed is reduced, and, thus, the amount of useful work which can be accomplished with a given amount of current is increased. The electrode 10 may be made in its body portion 14 of copper or of stainless steel or other suitable material. It is covered with an insulating layer 15 on its exterior surfaces, and, where trepanning is to be done, it is covered also by a similar insulating layer 16, FIG. 3, on the interior surfaces. The insulating material may be a thin layer of an epoxy resin or other suitable material.

A working tip 17 is attached to the copper or stainless steel body 14 of the electrode by silver brazing and is arranged as shown to extend slightly outwardly beyond the body of the electrode and preferably slightly beyond the insulating coating, both radially outwardly and radially inwardly. This is to provide suitable clearance for the passage of the insulating layer. The working tip 17 is preferably made of a tungsten silver or tungsten copper alloy because these materials are especially resistant to damage through accidental sparking between the work and the tip of the electrode. Ordinarily, the working tip will have a thickness in the axial direction of about .030" and will project inwardly and outwardly beyond the wall of the body of the electrode by a distance of the order of .005" to .015".

Figure 3:
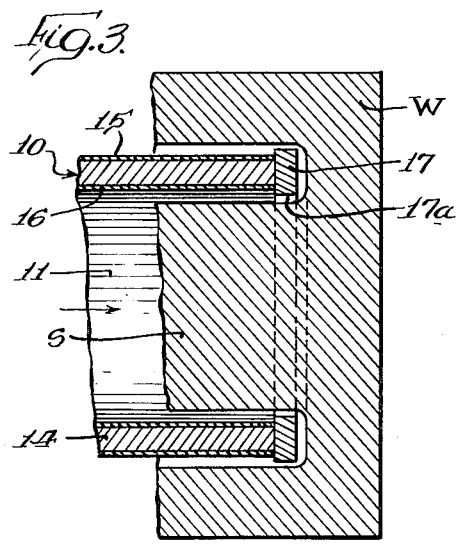
FIG. 3 shows in fragmentary section the tip of a previous type of electrode in which vibration difficulties are sometimes encountered.
Figure 4:
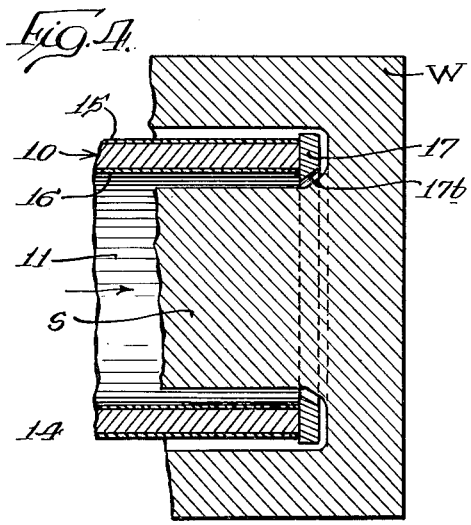
FIG. 4 is a fragmentary sectional view similar to FIG. 3 of another type of electrode which may cause difficulty with vibration.

Referring to FIGS. 3 and 4, electrodes substantially like that in FIG. 2 are shown somewhat schematically in section after having penetrated some distance into a piece of work material W. In FIG. 3, the working tip 17 has edges 17a which are parallel to the axis of motion of the electrode body 10. In FIG. 4, the working tip is modified by fairing the surfaces which heretofore has sometimes been done to smooth the flow of electrolyte. This is noted particularly at 17b.

It has been found that electrodes of the designs shown in FIGS. 3 and 4 will both vibrate, and that of FIG. 4 will be the more troublesome of the two. Through numerous studies, analyses and experiments, discovery was made of what is believed to be the source of this vibration. According to this theory the surfaces of electrodes of this type at 17a (in FIG. 3) and 17b (in FIG. 4) lie substantially parallel to a portion of the work material which is projecting upwardly into the electrode. Some of this work material will project upwardly at S into the opening in the electrode even when the electrode is not insulated on its interior surface. When there is any sideward jerk or discontinuity of motion, induced for example by a bubble in the electrolyte feed system or by external vibration, it is possible that the electrode will be moved laterally so that the surface 17a or 17b, as the case may be, will be brought somewhat closer to the work material. When this occurs, the velocity of the electrolyte passing these surfaces will be accelerated, and, consequently, due to the Bernoulli effect, the pressure will be reduced. As the pressure is reduced, this may cause the electrode to move even farther toward the workpiece, and this will continue until the flow path is sufficiently constricted by proximity between the working tip surface at 17a or 17b and the work material, so that the flow velocity is reduced and the static force increases. When this occurs, the energy stored in the electrode by its having been moved away from its normal position may be released, and thereupon spring back in a generally opposite direction, whereupon the generally opposite side of the electrode comes in closer proximity with the work material, thus pulling the electrode in the generally opposite direction so that the cycle is then repeated. This process or one like it, whatever its detailed mechanism, causes vibrations of the electrode of considerable amplitude, as great as .010″ to .030″ or even more, often in an elliptical motion, at a frequency dependent, of course, upon the constants of the system but varying under various conditions from about 50 cycles per second upward to an estimated 500 cycles per second, producing a high, whistling sound.

It is sometimes possible to overcome the vibration by increasing the rigidity of the electrode or by increasing or decreasing the gap by adjusting voltage or by adjusting the pressure applied, but none of these really eliminates the problem.

There is shown in FIG. 5 a configuration of the tip of an electrode which surprisingly, in all the tests that it has been possible to conduct, overcomes any tendency to vibrate.

It will be seen that the configuration of the working tip 18 is quite different from that shown in FIG. 4 or FIG. 3, which had heretofore seemed the natural or proper shape, in the respect that according to this invention the working tip is undercut at 18a so as to leave a relatively sharp edge 18b at the electrode outlet having a width not substantially greater than .010″. With this configuration, the tendency to vibrate seems to be overcome, or at least minimized, and it is believed the explanation for this to be the following: The undercut portion at 18a serves as a small plenum or pocket for the passage of electrolyte toward the work gap. The edge 18b which is left near the frontal surface of the working tip by the undercut of 18a is quite narrow. Accordingly, any discontinuity which causes the electrode to deflect will bring the sharp edge in closer proximity to the slug of work material extending upwardly within the electrode. While this might be expected to increase the velocity at the sharp edge and doubtless does so, the lateral area upon which the reduced pressure may act is very small. On the other hand, as the sharp edge tends to close the gap slightly toward the workpiece, this leads to a restriction in flow and a consequent increase in the static pressure in the undercut portion at 18a, thus immediately tending to restore the electrode to its normal position. Accordingly, there is no tendency to develop the regenerative action which causes the vibration of the electrode designs of FIGS. 3 and 4.

In the case of this electrode, as a matter of constructional convenience, the working tip 18 is turned to define an extension 18c, and an annular recess 10c may be cut in the body 14 of the electrode 10 so that the working tip 18 may be seated in this recess and then silver soldered in place, thus providing a strong connection. The extension of the working tip at 18c may project axially slightly into the bore or opening of the body of the electrode 10, thereby providing some degree of protection against heat, electrolyte gassing and sparking for the interior insulation 16.

Also, it will be noted that the external surface of the electrode may be chamfered at a slight angle of two or three degrees, as shown at 18d, so as to avoid the possibility of any Bernoulli effect at this point. While this may be done and while there may be some advantage in it, the much more important and controlling aspect of the invention lies in providing the undercut at 18a.

A simple variant of the same arrangement is shown in FIG. 6, in which working tip 19 is simply chamfered internally, as shown at 19a, leaving a sharp edge having a width not substantially greater than .010″, and this will operate in the same manner.

FIG. 7 details the construction of an electrode of this type which has been successfully used; in this figure the reference characters of FIG. 5 are used to designate the same elements or features.

The electrode 10 is cylindrical and its effective working length is slightly more than 2″. It is intended for sinking holes .455″ into or through a workpiece. The outside diameter of the tip 18 is .435″ and its circumferential surface 18d is .040″ in axial width. The electrode tube 14 has an outer diameter of .390″ and an inner diameter of .312″ before coating with the thin layers 15 and 16 of insulating material to a thickness of .002″ to .010″. The axial length of the extension 18c is .040″, and it has an outer diameter of .346″. The annular recess 10c in the tube 14 has an axial length of .025″ to leave a space 20 measuring .015″ in width to receive the silver solder 22, thus leaving an external groove behind the flange of the tip 18 having a width of .015″ and a depth of .005″.

It is preferred that an unfinished tip fitting 18 be soldered to the electrode tube 14 and finished in place. Such unfinished fitting has an outer diameter of .445″ to be turned to .435″. It has an inner diameter 18e (see dotted line, FIG. 7) of .290″, and this is turned to define the recess 18a, the tip edge 18b at the outlet, and the innermost edge or surface 18f. The deepest portion 18g of the recess has a diameter of .330″ and is spaced .040″ from the outer and working face 18h of the tip. The recess 18a angles radially inwardly toward the outlet tip 18b at an angle of 20° to a surface parallel to the axis of the electrode to provide an outlet opening of .308″ at 18b with no or not more than .010″ axial length. The diameter of the edge or surface 18f is .298″ which is smaller than the inner diameter .312 of the tube 14 to provide the previously mentioned protection for the inner insulating layer 16. The stated dimensions are given within a tolerance of −.001″, and the dimensions of surfaces not given naturally follow from the others.

It is not intended by this detailed description of a typical electrode 10 for sinking a specific cavity to limit the herein disclosed invention. These dimensions are typical of one type of electrode, i.e., cylindrical, and have been given to assist in a better understanding of the invention.

A characteristic of the invention is to provide at the exit of the hollow portion of an electrode a portion of a working tip which extends inwardly with respect to the opening in the electrode in such a way as to form a relatively sharp edge and to leave behind the sharp edge a space in which electrolyte normally passes into the work gap so that in the event of discontinuity or displacement of the electrode laterally there is no significant area exposed to pressure reduced by an increase in velocity and so that there may be actually some increase in static pressure in the zone immediately behind the relatively sharp edge.

It has been found that with this electrode configuration and in using this method of preventing vibration, electrodes of rather thin walls and rather considerable length may be penetrated at rates of the order of .200″ per minute or more into workpieces at operating electrolyte pressures of the order of 150 to 250 p.s.i. without vibration and the deleterious consequences thereof.

From the foregoing description it will be apparent that the objectives which were claimed for this invention in the opening paragraphs of this specification have been fully attained.

While preferred embodiments of a new and improved electrolytic cavity sinking electrode and method of using them have been shown and described, it will be apparent that numerous modifications and variations may be made therein without departing from the underlying principles of the invention. It is, therefore, intended by the following claims to include all such variations and modifications by which substantially the results of this invention may be obtained through the use of the same or equivalent means.

What is claimed as new and desired to be secured by United States Letters Patent is:

1. An electrode for electrolytic cavity sinking in a workpiece capable of being electrochemically eroded comprising, a long thin walled tube of substantially uniform transverse section having means at one end for supporting said tube and supplying an electrolyte under pressure thereto, said tube having an electrically nonconductive exterior surface, and an outlet tip fitting secured to the opposite end of said tube and having an electrically conductive exterior working face, said tip fitting having an outlet opening at said exterior face defined by a lip having an axial width not substantially greater than .010", and said tip fitting being undercut immediately inwardly of said lip to define a static pressure chamber adjacent said outlet opening, whereby vibration of said tube is avoided.

2. An electrode for electrolytic cavity sinking in a workpiece capable of being electrochemically eroded comprising, a long thin walled tube of substantially uniform transverse section having means at one end for supporting said tube and supplying an electrolyte under pressure thereto, said tube having an electrically nonconductive exterior wall, and an outlet tip fitting secured to the opposite end of said tube and having an electrically conductive exterior working face, said tip fitting providing a lateral flange projecting slightly and uniformly beyond the exterior wall of said tube with its outer edge surface sloping slightly axially inwardly from said working face, said tip fitting having an outlet opening at said working face defined by a lip having an axial width not substantially greater than .010", and said tip fitting being undercut immediately inwardly of said lip to define a static pressure chamber adjacent said outlet opening, whereby vibration of said tube is avoided.

3. An electrode as claimed in claim 2, wherein said outer edge surface of said flange slopes inwardly at about 2° to 3°.

4. An electrode for electrolytic cavity sinking in a workpiece capable of being electrochemically eroded comprising, a long thin walled tube of substantially uniform transverse section having means at one end for supporting said tube and supplying an electrolyte under pressure thereto, said tube having an electrically nonconductive exterior surface, and an outlet tip fitting secured to the opposite end of said tube and having an electrically conductive exterior working face, said tip fitting having an outlet opening at said working face defined by a lip having an axial width not substantially greater than .010", and said tip fitting being sloped inwardly from the inner surfaces of said tube toward said lip to define a static pressure chamber immediately inwardly of said lip and adjacent said outlet opening, whereby vibration of said tube is avoided.

5. An electrode for electrolytic cavity sinking in a workpiece capable of being electrochemically eroded comprising, a long thin walled tube of substantially uniform transverse section having means at one end for supporting said tube and supplying an electrolyte under pressure thereto, said tube having an electrically nonconductive exterior surface, and an outlet tip fitting secured to the opposite end of said tube and having an electrically conductive exterior working face, said tip fitting having an outlet opening at said working face defined by a lip having an axial width not substantially greater than .010", and said tip fitting having an inner peripheral recess immediately inwardly of said lip and adjacent said outlet opening to define a static pressure chamber thereat, whereby vibration of said tube is avoided.

6. An electrode for electrolytic cavity sinking in a workpiece capable of being electrochemically eroded comprising, a long thin walled tube of substantially uniform transverse section having means at one end for supporting said tube and supplying an electrolyte under pressure thereto, said tube having an electrically nonconductive exterior surface, and an outlet tip fitting secured to the opposite end of said tube and having an electrically conductive exterior working face, said tip fitting having an outlet opening at said working face defined by a lip having an axial width not substantially greater than .010", said tip fitting having an inner peripheral recess immediately inwardly of said lip and adjacent said outlet opening to define a static pressure chamber thereat, and said recess having one wall thereof extending inwardly from said working face and radially outwardly at an angle of about 20° with a surface parallel to the axis of said tube, whereby vibration of said tube is substantially eliminated.

7. An electrode for electrolytic cavity sinking in a workpiece capable of being electrochemically eroded comprising, a long thin walled tube of substantially uniform transverse section having means at one end for supporting said tube and supplying an electrolyte under pressure thereto, said tube having an electrically nonconductive exterior wall, and an outlet tip fitting secured to the opposite end of said tube and having an electrically conductive exterior working face, said tip fitting providing a lateral flange projecting slightly and uniformly beyond the exterior wall of said tube, said tip fitting having an outlet opening at said working face defined by a lip having an axial width no greater than .010", and said tip fitting having an inner peripheral recess immediately inwardly of said lip and adjacent said outlet opening to define a pressure chamber thereat, and said recess having one wall thereof extending inwardly from said working face and radially outwardly at an angle of about 20° with a surface parallel to the axis of said tube, whereby vibration of said tube is avoided.

References Cited by the Examiner

UNITED STATES PATENTS

| 2,308,960 | 1/1943 | Clark | 219—121 |
| 2,913,383 | 11/1959 | Topfer | 204—224 |
| 3,019,178 | 1/1962 | Williams | 204—284 |
| 3,023,153 | 2/1962 | Kurshan | 204—143 |
| 3,075,903 | 1/1963 | Costa et al. | 204—143 |

FOREIGN PATENTS 335,003    9/1930    Great Britain.

JOHN H. MACK, *Primary Examiner.*

Dedication 3,218,248.—*Lynn A. Williams*, Winnetka, Ill. ELECTROLYTIC CAVITY SINKING APPARATUS AND METHOD. Patent dated Nov. 16, 1965. Dedication filed Dec. 23, 1971, by the assignee, *Anocut Engineering Company*.

Hereby dedicates to the Public the portion of the term of the patent subsequent to Dec. 24, 1971.

[*Official Gazette March 21, 1972.*]